US012738082B2

(12) United States Patent
Srinivasan et al.

(10) Patent No.: US 12,738,082 B2
(45) Date of Patent: Sep. 15, 2026

(54) IDENTIFYING ITEMS IN IMAGES USING EMBEDDINGS GENERATED FROM THE IMAGES AND RANKING CANDIDATES USING A LANGUAGE MODEL

(71) Applicant: Maplebear Inc., San Francisco, CA (US)

(72) Inventors: Prithvishankar Srinivasan, San Francisco, CA (US); Shishir Kumar Prasad, Fremont, CA (US); Bryan Pham, London (CA); Kristen Morgan, Toronto (CA); Preeti Chadha, Poughkeepsie, NY (US); Rakshit Shukla, Mississauga (CA)

(73) Assignee: Maplebear Inc., San Francisco, CA (US)

(*) Notice: Subject to any disclaimer, the term of this patent is extended or adjusted under 35 U.S.C. 154(b) by 197 days.

(21) Appl. No.: 18/888,131

(22) Filed: Sep. 17, 2024

(65) Prior Publication Data

US 2026/0080701 A1 Mar. 19, 2026

(51) Int. Cl.

| | |
|---|---|
| ***G06V 30/19*** | (2022.01) |
| ***G06F 40/40*** | (2020.01) |
| ***G06V 30/148*** | (2022.01) |
| *G06V 10/764* | (2022.01) |
| *G06V 10/82* | (2022.01) |

(52) U.S. Cl.

CPC ........ *G06V 30/19093* (2022.01); *G06F 40/40* (2020.01); *G06V 30/153* (2022.01); *G06V 30/19* (2022.01); *G06V 30/191* (2022.01); *G06V 10/764* (2022.01); *G06V 10/82* (2022.01)

(58) Field of Classification Search

None

See application file for complete search history.

(56) References Cited

U.S. PATENT DOCUMENTS

| | | | | |
|---|---|---|---|---|
| 2017/0286397 A1* | 10/2017 | Gonzalez | .............. | G06F 40/211 |
| 2021/0256300 A1* | 8/2021 | Shankar | ................. | G06V 10/56 |
| 2022/0292843 A1* | 9/2022 | Koterba | ................. | G06V 10/56 |
| 2023/0037427 A1* | 2/2023 | Brakob | .................. | G06V 20/68 |

(Continued)

OTHER PUBLICATIONS

Written opinion for International Application PCT/US2025/044795 (Nov. 12, 2025) (Year: 2025).*

*Primary Examiner* — David N Werner
(74) *Attorney, Agent, or Firm* — Fenwick & West LLP

(57) ABSTRACT

An online system applies a visual language model and an optical character recognition model to a received image to generate descriptive information about unknown items in the image. The online system prompts a generative model with the descriptive information about unknown items in the image to separate the descriptive information into different bins each corresponding to a different unknown item in the image. For each unknown item detected in the image, the online system generates a target embedding from its descriptive information and performs a nearest neighbor search on an item catalog including embeddings for various items to find a set of candidate embeddings matching the target embedding. The online system retrieves item attributes of candidate items each corresponding to a candidate embedding of the set and prompts the generative model with this information to rank candidate items for the unknown item in the image.

20 Claims, 4 Drawing Sheets

(56) References Cited

U.S. PATENT DOCUMENTS

2023/0394854 A1* 12/2023 Polavaram ............. G06V 20/41
2024/0282131 A1* 8/2024 Ren .................... G06V 10/7753
2024/0427985 A1* 12/2024 Vavrovsky ............. G06Q 50/18
2025/0078343 A1* 3/2025 Chen ..................... G06F 40/109
2025/0181899 A1* 6/2025 Ajmera ................ G06N 3/0475
2025/0225314 A1* 7/2025 Sharpe .................. G06F 40/166
2026/0080221 A1* 3/2026 Raghavan ............ G06N 3/0475

* cited by examiner

IDENTIFYING ITEMS IN IMAGES USING EMBEDDINGS GENERATED FROM THE IMAGES AND RANKING CANDIDATES USING A LANGUAGE MODEL

BACKGROUND

Various online systems receive orders for items from one or more users and obtain items identified in an order. For example, an online system receives an order from a user including one or more items from a source selected by the user. The online system allocates the order to a picker who obtains the items from the source and delivers the obtained items to a location included in the order.

To simplify identification of items, such as for inclusion in an order, various online systems may receive an image and extract one or more items available via an online system from the image. The user may review the items extracted from the image by the online system and select one or more items extracted from the image for inclusion in an order. Extracting items from an image reduces an amount of interaction with the online system by a user to identify items offered by the online system.

To extract items from a received image, various online systems apply trained models to a received image that extract items offered by the online system from the image. Many online systems train one or more specific models to extract images in an item based on visual features within the image and visual features of images of various items. Such a model extracts an image from an item based on similarity between visual features of one or more images of the item and visual features of the received image. Training a model to extract one or more items from an image based on comparison to images of items involves a large quantity of training examples that include multiple images of various items with labels identifying items applied. Such a quantity of training examples makes training of the model time-intensive and resource-intensive. Additionally, such a trained model is unlikely to accurately identify items that were not previously included in one or more training examples. As items available through an online system often change over time, and retraining a model for each new item available through the online system changes expends significant time and computing resources.

SUMMARY

In accordance with one or more aspects of the disclosure, an online system receives selections of items from a user and obtains the selected items from a source. For example, a user creates an order including one or more items and specifies a source for obtaining the one or more items. Subsequently, the online system allocates the order to a picker who obtains the items from the source and delivers the items to a location specified by the order. A user may manually select one or more items through interaction with one or more interfaces of the online system. Although, to simplify creation of an order, the online system may receive an image from a user and identify items offered by the online system included in the image.

To identify an item for a user, the online system receives an image from a client device, such as a user client device or a picker client device including one or more unknown items. The image does not include metadata or other data used by the online system to uniquely identify items in the image. Additionally, the online system does not receive metadata including data used by the online system to uniquely identify items in the image. Hence, items included in the image are unknown items, as the online system is unable to uniquely identify an item offered by the online system from the image itself.

The image may include different content in various embodiments. For example, the image is of a flyer or other material including the unknown item and text information. The text information may include information about the unknown item, such as one or more attributes of the unknown item, as well as other information, such as a discount or another incentive for a user to obtain the unknown item. As another example, the image includes one or more unknown items but does not include text information. For example, the image includes one or more unknown items and was captured by a user client device. The image may include multiple unknown items. For example, the image is a portion of an area including multiple items, such as a cabinet, an aisle, or a shelf including multiple items. In some embodiments, the online system receives the image from a picker client device. For example, the image includes a portion of an aisle of a source including multiple items captured by a picker. Each item in the image is an unknown item 405 in the preceding example, as the image does not include identifiers used by the online system for individual items.

The online system leverages the image to simplify order creation or item selection by a user identifying one or more items offered by the online system corresponding to the unknown item. To identify one or more items offered by the online system corresponding to the unknown item, the online system applies one or more models to the image to extract descriptive information from the image. In various embodiments, the online system applies an optical character recognition (OCR) model and a visual language model (VLM), to the image to extract descriptive information about each unknown item included in the image. In other embodiments, the online system applies one or more different, additional, or alternative models to the image to extract descriptive information about each unknown item in the image. The online system 140 applies multiple models, such as the OCR model and the VLM, to the image in parallel in various embodiments.

Applying the OCR model to the image extracts text, such as the text information, from the image to include in the descriptive information. The OCR model identifies portions of the image including text, such as the text information, and extracts the text from the corresponding portions of the image to include in the descriptive information. One or more OCR models may be applied to the image in various embodiments to extract text from the image.

While the OCR model extracts text from the image the descriptive information of one or more unknown items, other visual features of the image also include descriptive information about one or more unknown items included in the image. Some images may not include text information, so visual features of such images provide the descriptive information about one or more unknown items included in the image. The online system extracts descriptive information for an unknown item included in an image by applying one or more VLMs to the image. A VLM receives the image and a prompt as input and generates an output for the prompt based on the image. The output of the VLM comprises descriptive information about one or more unknown items in the image. In various embodiments, the online system applies the VLM to combinations of different prompts and the image to extract different types of descriptive information about the unknown item from the image. The online system may apply multiple VLMs to the image in some embodiments.

The visual language model comprises a multimodal generative model receiving the image and text data (e.g., a prompt) as input and that generates an output based on the received image and text data. For example, the visual language model generates text data based on the received image and text data. The visual language model is pre-trained on a set of multimodal training data, with the multimodal training data comprising an image and text corresponding to the image. In some embodiments, the visual language model is pre-trained to perform one or more specific tasks, such as visual question answering, where the visual language model receives an image and a question about the image and generates an answer to the question based on the image. Applying the visual language model to combinations of the image and different questions extracts different descriptive information about the unknown item in various embodiments.

While applying one or more OCR models and one or more VLMs to the image extracts descriptive information about an unknown item in the image, the descriptive information may not initially be clearly associated with the unknown item. For example, the descriptive information includes text information describing a discount or an incentive to obtain the unknown item, which is unrelated to identifying items corresponding to the unknown item. Similarly, the VLM may not identify one or more unknown items in the image, while identifying other unknown items. Further, descriptive information extracted by the OCR model includes text from the image that does not initially have a format where attributes of the unknown item in the text descriptive information are clearly associated with the unknown item. For example, the OCR model extracts a string of text from the image, regardless of whether the text is related to an unknown item in the image.

To correlate descriptive information extracted by the OCR model and by the VLM with the unknown item in the image, the online system applies a generative model, such as a large language model (LLM), to the descriptive information. In various embodiments, the online system generates a prompt for the generative model including the descriptive information and one or more instructions to segment the descriptive information into one or more bins. Each bin corresponds to an unknown item included in the image. A bin includes a name or a description of an unknown item and one or more attributes of the unknown item determined from the descriptive information by the generative model. An instruction included in the prompt specifies a format for a bin. For example, the prompt includes an instruction to generate a bin for each unknown item identified in the image, with a bin including a name or a description of the unknown item and one or more attributes of the unknown item determined from the descriptive information by the generative model. The bin corresponding to the unknown item comprises a search query including a name or a description of the unknown item and attributes of the unknown item from the descriptive information in various embodiments to simplify identification of one or more items corresponding to the unknown item.

Applying the generative model to the descriptive information segments the descriptive information extracted from the image into one or more bins each including a name or a description of an unknown item in the image. Additionally, applying the generative model to the descriptive information identifies specific attributes of an unknown item from the descriptive information output by the OCR model and the VLM and includes the identified attributes of the unknown item in the bin corresponding to the unknown item. Segmenting the descriptive information into discrete unknown items and attributes for each unknown item generates different bins each including a name or a description of an unknown item and attributes corresponding to the unknown item.

Based on the attributes of the unknown item included in a corresponding bin, the online system generates a target embedding for the unknown item. In various embodiments, the online system applies an embedding model to the attributes of the unknown item included in the bin to generate the target embedding representing the unknown item corresponding to the bin in a latent space. In various embodiments, the online system also applies the embedding model to items included in an item catalog of a source to generate embeddings for each item in the item catalog. Similarly, the online system may apply the embedding model to each item identified to the online system by a source or by a user to generate and to maintain representations of items in the latent space. In some embodiments, the online system maintains an index of embeddings for items to facilitate subsequent retrieval of embeddings for items. The online system 140 may maintain an index of item identifiers and corresponding embeddings for each source or for each item category in various embodiments. Alternatively or additionally, the index of embeddings may be included in the item catalog for the source, with the embedding for an item included in the item catalog in association with an item identifier and attributes of the item. Hence, the target embedding represents the unknown item corresponding to the bin in a common latent space as other items previously identified to the online system.

The online system applies an approximate nearest neighbor (ANN) model to the target embedding and to embeddings for items offered by a source (or to embeddings in another type of index), or otherwise identified to the online system to select a set of candidate items for the unknown item. In various embodiments, the ANN model determines distances (e.g., Euclidean distances) between the target embedding and embeddings for various items, ranks the embeddings for various items based on the distances from the target embedding, and selects a set of candidate embeddings having at least a threshold position in the ranking. The ranking in the preceding example includes embeddings for items having smaller distances to the target embedding in higher positions. Alternatively, the ANN model determines measures of similarity (e.g., cosine similarity, dot product) between the target embedding and embeddings for various items (e.g., items included in an item catalog), ranks the items based on the measures of similarity to the target embedding, and selects a set of candidate embeddings having at least a threshold position in the ranking. In the preceding example, the ranking includes embeddings for items having higher measures of similarity to the target embedding in higher positions. The set of candidate items comprises items corresponding to the set of candidate embeddings. Hence, the ANN model selects a set of candidate embeddings that are nearest to the target embedding (or that have higher measures of similarity to the target embedding). As the set of candidate items are items corresponding to the candidate embeddings, each of the candidate items has an embedding that is near the target embedding in the latent space.

While selecting the candidate embeddings based on distances, or measures of similarity, between the target embedding and embeddings for items selects a set of candidate items nearest to the target embedding in the latent space, different attributes of candidate items in the set may be more or less similar to attributes of the unknown item. For example, different items offered by the online system have multiple attributes that match attributes of the unknown item, so the different items are included in the set of candidate items. However, certain additional attributes of one or more candidate items are more similar to attributes of the unknown item included in the bin, which is not fully accounted for during selection based on the distances, or measures of similarity, between embedding. While the ANN model selects a set of candidate items that are similar to the unknown item, the set does not specify which candidate item is most similar to the unknown item.

To simplify subsequent review or selection of a candidate item of the set by a user, the online system retrieves attributes of each candidate item from an item catalog and generates a prompt including identifiers of each candidate item and associated attributes, the attributes of the unknown item included in the bin, and an instruction to rank the candidate items based on similarity of their attributes to the attributes included in the bin. The online system applies the generative model (e.g., the LLM) to the prompt to rank the candidate items based on similarity of attributes of different candidate items to attributes included in the bin corresponding to the unknown item. In various embodiments, the prompt to which the generative model is applied specifies a number of candidate items to include in the ranking. The generative model positions candidate items having attributes more similar to attributes of the unknown item higher in the ranking.

Applying the generative model to the attributes included in the bin and to the attributes of different candidate items further refines ordering of the candidate items of the set. This provides candidate items with attributes more similar to attributes of the unknown item with higher positions in the ranking, making them more likely to be visible to the user. For example, the set of candidate items includes candidate items having multiple common attributes and a single differing attribute (e.g., size), and application of the generative model 430 to the attributes of the candidate items and to the attributes included in the bin corresponding to the unknown item generates a ranking with candidate items with sizes closer to the size of the unknown item having higher positions.

Subsequently, the online system presents the candidate items to the user in an order determined by the ranking. In some embodiments, the online system presents a subset of the set of candidate items to the user in the order determined by the ranking, while in other embodiments, the online system presents the set of candidate items in the order determined by the ranking. The prompt to generate the ranking specifies a number of candidate items to include in the ranking in various embodiments, so the online system presents the number of items specified by the prompt to the user based on the ranking.

Generating the target embedding for the unknown item from descriptive information for the unknown item extracted from the image by the OCR model and the visual language model allows the online system to leverage stored embeddings for items to identify the set of candidate items for the unknown item using the ANN model. This identifies the set of candidate items for the unknown item without specifically training a model to identify different items from images through application to labeled training images of individual items. Identifying the unknown item and attributes of the unknown item using the OCR model and the visual language model allows the online system to generate the target embedding for the unknown item for comparison to embeddings for other items from the image itself, which reduces an amount of time and computational resources used to identify an item in an image, while allowing easier identification of a wider range of items in an image. This more efficiently identifies items from images by removing training of a model before application to an image provided to the online system.

DETAILED DESCRIPTION

Figure 1:
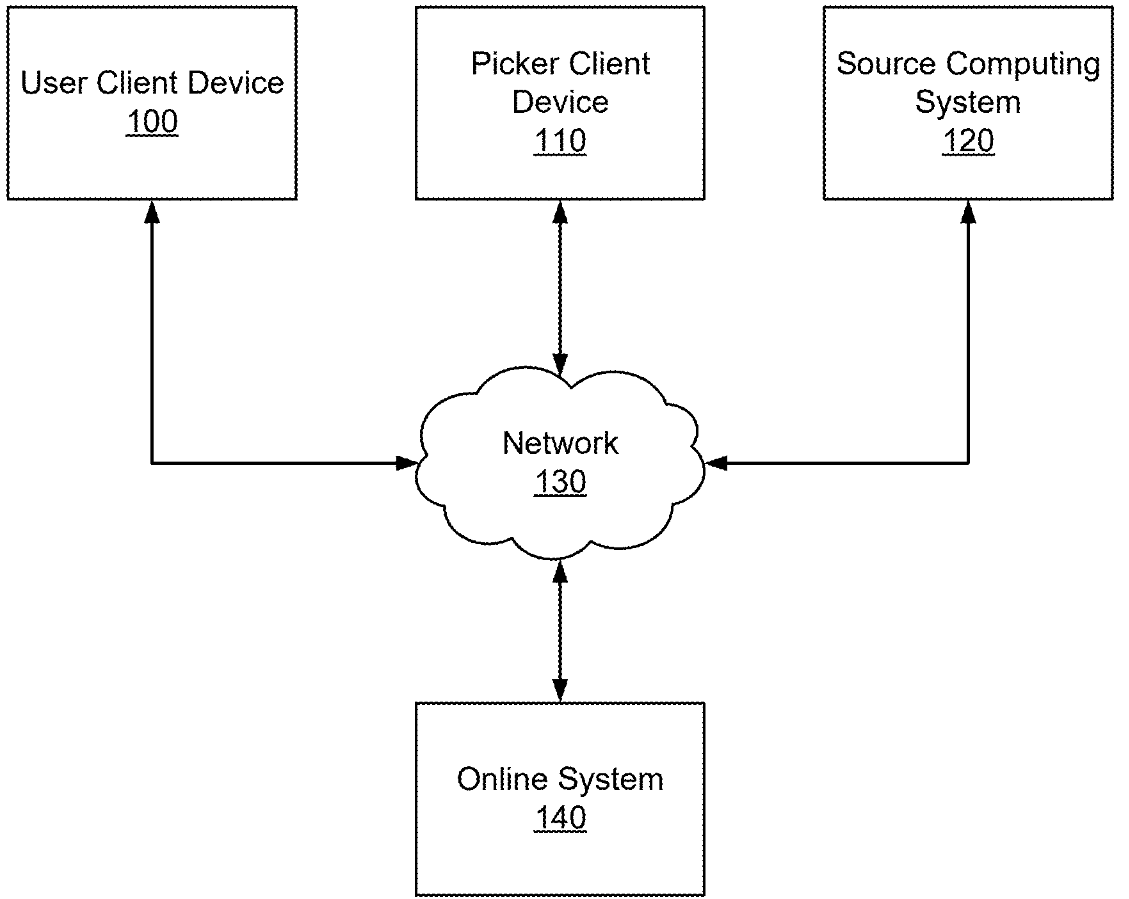
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." A "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected. In various embodiments, the ordering interface, or another interface, allows a user to capture an image including one or more items for transmission to the online system 140. As further described below in conjunction with FIGS. 3 and 4, the online system 140 identifies items corresponding to the one or more items in the image to the user, allowing the user to select or to identify items based on the image.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item. In various embodiments, a picker captures an image including one or more items via the picker client device 110, which transmits the image to the online system 140. As further described below in conjunction with FIGS. 3 and 4, the online system 140 identifies items corresponding to the one or more items in the image to the user, allowing the user to select or to identify items based on the image.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order. Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a grocery store source. The user's order may specify which groceries they want to be delivered from the grocery store and the quantities of each of the groceries. The user's client device 100 transmits the user's order to the online system 140 and the online system 140 selects a picker to travel to the grocery store source location to collect the groceries ordered by the user. The online system transmits an offer to the picker for the picker to service the order in exchange for consideration and, if the picker accepts the offer, the picker collects the groceries from the grocery store. Once the picker has collected the groceries ordered by the user, the picker delivers the groceries to a location transmitted to the picker client device 110 by the online system 140. The online system 140 is described in further detail below with regards to FIG. 2.

Figure 2:
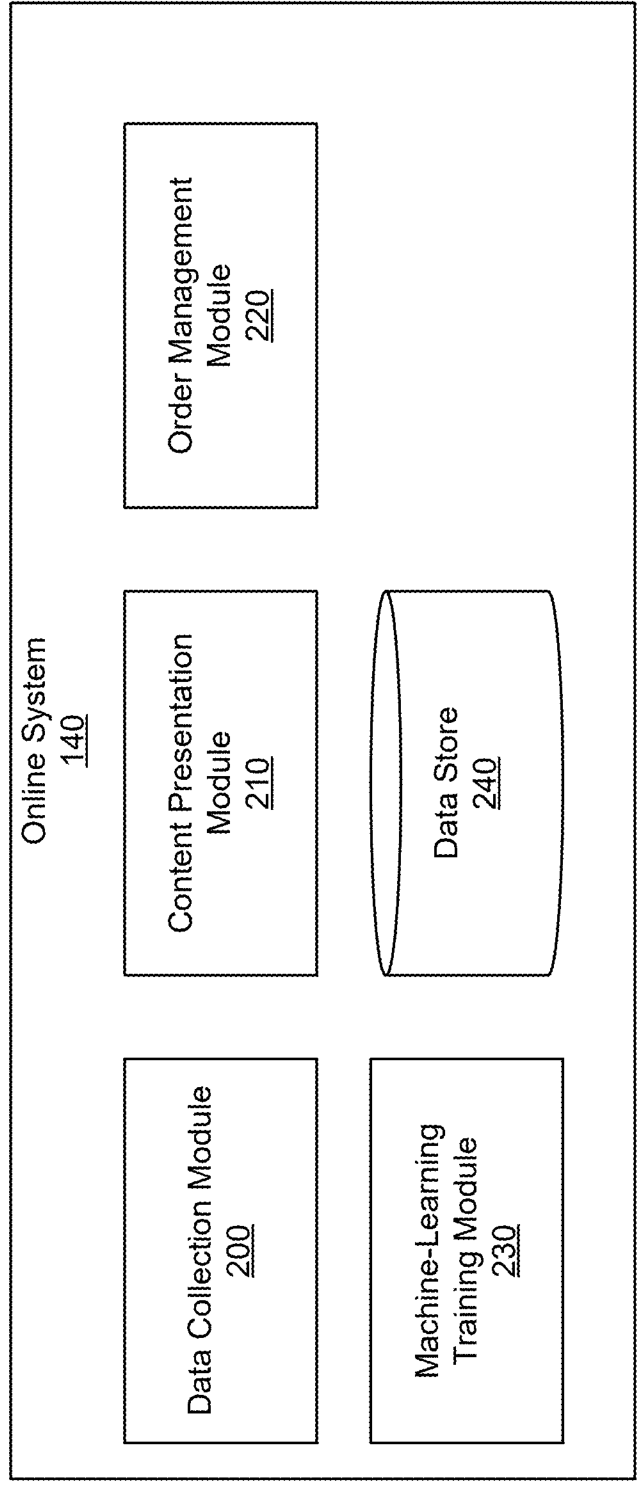
FIG. 2 illustrates an example system architecture for an online system, in accordance with one or more embodiments.

FIG. 2 illustrates an example system architecture for an online system 140, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from a source computing system 120, a picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

In various embodiments, the content presentation module 210 receives an image from a client device, such as a user client device 100 or a picker client device 110, including one or more unknown items. Items in the image are unknown items because the image does not include data used by the online system 140 to uniquely identify the items. The content presentation module 210 leverages the image to identify one or more items offered by the online system 140 to a user from whom the image was received. The user may select one or more of the identified items for inclusion in an order or for obtaining additional information, allowing the user to select items based on the image rather than by navigating through one or more interfaces presented by the content presentation module 210 to identify items.

Rather than train a model to compare visual features from the image to visual features of images corresponding to different items, the content presentation module 210 identifies items included in an image by applying one or more optical character recognition (OCR) models and one or more visual language models (VLMs) to an image to extract descriptive information about one or more unknown items from text and visual content in the image. As further described below in conjunction with FIGS. 3 and 4, the content presentation model 210 applies a generative model, such as a large language model (LLM), to the descriptive information extracted from the image. The generative model segments the descriptive information into one or more bins that each correspond to an unknown item. A bin includes one or more attributes of a corresponding unknown item that the generative model determined from the descriptive information, so each bin includes attributes of a corresponding unknown item identified from the image.

For a bin corresponding to an unknown item, the content generation module 210 generates a target embedding representing the unknown item in a common latent space as other items known to the online system 140 (e.g., items in an item catalog for a source, items previously identified to the online system, etc.). The content presentation module 210 compares the target embedding for the unknown item to embeddings for other items and selects a set of candidate items each corresponding to a candidate embedding satisfying one or more conditions based on the comparison, as further described below in conjunction with FIGS. 3 and 4. The content presentation module 210 applies the generative model to attributes of each candidate item and to the attributes in the bin corresponding to the unknown item to rank the candidate items, as further described below in conjunction with FIGS. 3 and 4. The content presentation module 210 presents at least a subset of the candidate items to the user based on the ranking generated by the generative model. The ranking has candidate items with attributes more similar to the attributes of the unknown item in higher positions, making the candidate items with more similar items more visible to a user.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

In various embodiments, the machine learning training module 230 trains or obtains one or more models for extracting text from an image. For example, the machine learning training module 230 obtains one or more optical character recognition models that extract text from an image. As another example, the machine learning training module 230 obtains a multimodal large language model (LLM) that receives input having a particular mode or type and generates output having an alternative mode or type. For example, a multimodal LLM receives an image as an input and generates text output based on the input image. The machine learning training module obtains or trains multiple models that extract text from an image in various embodiments.

In various embodiments, the machine learning training module 230 obtains a visual language model comprising a multimodal generative model that receives an image and text data as input. The visual language model generates an output based on the received image and text data. For example, the visual language model generates text data based on the received image and text data. As another example, the visual language model generates an output image based on the received image and text data. The visual language model is pre-trained on a set of multimodal training data, with the multimodal training data comprising an image and text corresponding to the image. Text corresponding to an image in the multimodal training data may be captions describing the image, labels of objects included in the image, or other descriptive information about the image. In some embodiments, the visual language model is pre-trained to perform one or more specific tasks, such as visual question answering, where the visual language model receives an image and a question about the image and generates an answer to the question based on the image. Pre-training of the visual language model for visual question answering may be performed by applying the visual language model to training examples each including a question and an image, with each training example labeled with an answer corresponding to the question included in the training example.

Additionally, the machine learning training module 230 trains or obtains one or more generative models. A generative model, such as a large language model (LLM), receives an input including a prompt and generates output based on the received input. For example, a generative model is a large language model (LLMs) previously trained on a large text corpus to learn relationships between different portions of text, such as between different words. Based on the previously learned relationships, the LLM generates output text from text received as input based on a prompt received as input. For example, a generative model receives a prompt including one or more formatting instructions and text data as input and generates output text in a format specified by the one or more formatting instructions and based on the input text and previously learned relationships between various text.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

Figure 3:
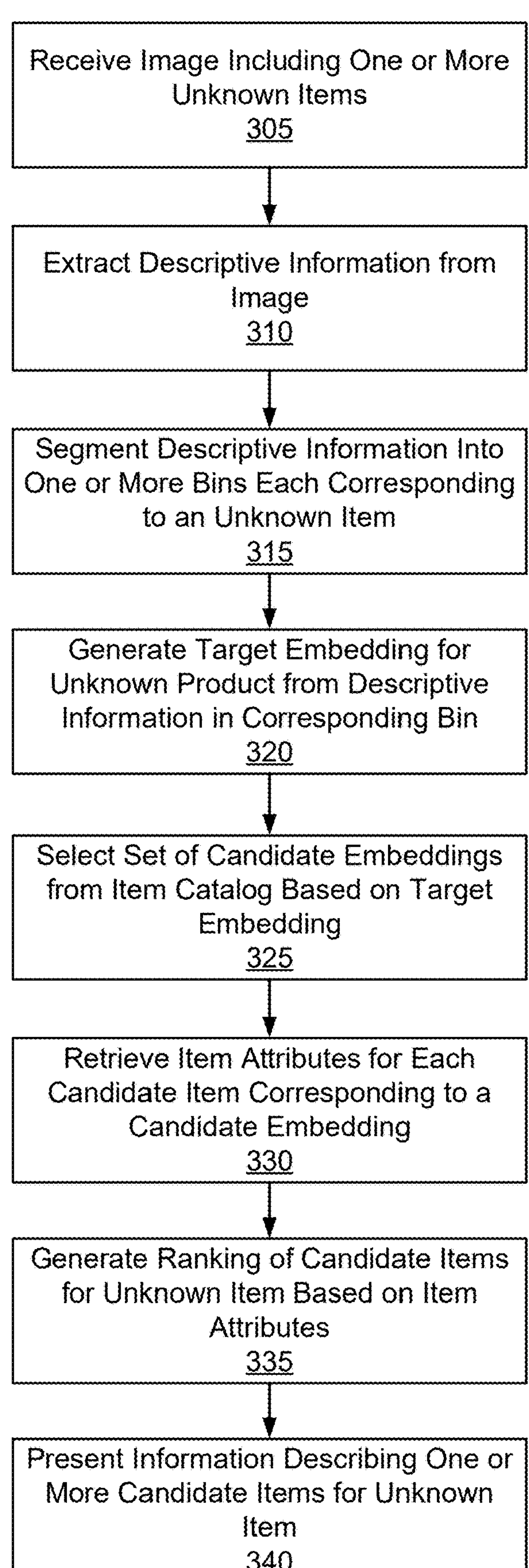
FIG. 3 illustrates a flowchart of a method for an online system to identify one or more items offered by a source matching an unknown item extracted from an image, in accordance with one or more embodiments.

FIG. 3 is a flowchart of a method for an online system to identify one or more items offered by a source matching an unknown item extracted from an image, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

The online system 140 receives 305 an image including one or more unknown items. In various embodiments, the online system 140 receives 305 an image including one or more unknown items from a user client device 100. For example, the online system 140 receives 305 an image of media including one or more unknown items from a user via a user client device 100. As another example, the online system 140 receives 305 an image of one or more unknown items captured by a user via the user client device 100 or obtained from the user client device 100. In an additional example, the online system 140 receives 305 an image of a portion of a source from a picker client device 110, with the portion of the source in the image including one or more items offered by the source. For example, the online system 140 receives 305 an image of a shelf inside a source including various items.

The online system 140 does not receive metadata or other data along with the image including identifiers used by the online system 140 to identify items, so the unknown items in the image are unable to be identified by the online system 140 based on the image. Additionally, the image does not include an identifier used by the online system 140 to identify one or more items in the image, so items in the image are unknown to the online system 140 based on the image. Hence, the image identifies one or more items to the online system 140, but the online system 140 is unable to identify an item available via the online system 140 to include in an order based on the image itself, making the items in the image unknown items.

To identify items offered by a source (or by the online system 140) matching one or more of the unknown items included in the image, the online system 140 extracts 310 descriptive information from the image for each unknown item included in the image. The descriptive information comprises information about one or more of the unknown items included in the image. For example, descriptive information about an unknown item in the image includes one or more attributes of the unknown item, a description of the unknown item, a name of the unknown item, or other information about the unknown item. In various embodiments, the online system 140 applies an optical character recognition (OCR) model to the image to identify and to extract text data from the image comprising descriptive information about one or more unknown items included in the image. Application of the OCR model extracts 310 descriptive information comprising text data included in the image.

To extract 310 descriptive information from non-textual portions of the image, the online system 140 applies one or more visual language models (VLMs) to the image. A visual language model (VLM) comprises a multimodal generative model that receives an image and text data as input. The VLM generates an output based on the received image and text data. For example, the VLM generates text data based on the received image and text data. The VLM is pre-trained on a set of multimodal training data, with the multimodal training data comprising various combinations of an image and text corresponding to the image. Different images and corresponding text are included in the multimodal training data. In some embodiments, the VLM is pre-trained to perform one or more specific tasks, such as visual question answering, where the VLM receives an image and a question about the image as input and generates an answer to the question based on the image. For example, the online system 140 applies a VLM to the image and to a prompt requesting the VLM identify one or more attributes of each unknown item included in the image. As another example, the online system 140 applies a VLM to the image and to a prompt requesting the VLM identify a specific attribute of each unknown item included in the image. The prompt may specify that the VLM generate different groups of attributes, with each group corresponding to a discrete unknown item in the image. In various embodiments, the online system 140 applies the VLM to combinations of the image and different prompts to extract 310 different types of descriptive information. Further, in various embodiments, the online system 140 applies multiple VLMs to the image to extract 310 descriptive information from non-textual portions of the image.

While application of one or more OCR models and one or more VLMs to the image extract 310 descriptive information about unknown items in the image, the descriptive information may not initially be clearly associated with an unknown item. For example, descriptive information extracted 310 from the image by a VLM identifies various unknown items, but does not identify at least one unknown item in the image. Similarly, descriptive information extracted 310 by an OCR model includes text from the image, but the OCR model's output may not initially have a format where attributes of an unknown item in the text descriptive information are clearly associated with the unknown item. For example, an OCR model extracts a string comprising text in different portions of the image without information correlating portions of the text with unknown items in the image.

To correlate descriptive information extracted 310 from the image with corresponding unknown items in the image, the online system 140 segments 315 the extracted descriptive information from the image into one or more bins. Each bin corresponds to an unknown item and includes descriptive information representing one or more attributes of the unknown item. In various embodiments, the online system 140 segments 315 the descriptive information by applying a generative model, such as a large language model (LLM), to correlate different descriptive information with different unknown items identified in the image, the online system 140 generates a prompt including the extracted descriptive information and an instruction to generate one or more bins from the extracted descriptive information, with each bin corresponding to a single unknown item. In some embodiments, the instruction included in the prompt identifies each bin as a search query that includes a name or a description of an unknown item and descriptive information comprising attributes of the unknown item associated with the unknown item. A bin may include a name of an attribute for the unknown item and a value of the attribute of the unknown item obtained from the descriptive information.

In various embodiments, the generative model (e.g., the LLM) generating 315 the bins corresponding to unknown items in the image is pre-trained on a large text corpus to learn relationships between different portions of a text input, such as different words or phrases, to generate an output based on the text input. Leveraging relationships between portions of text learned during pre-training allows the generative model to generate an output in response to an instruction included in a prompt based on additional data included in the prompt. The online system 140 leverages the relationships between portions of text learned by the generative model to segment 315 the descriptive information into one or more bins that each include descriptive information corresponding to different unknown items in the image. Segmenting 315 the descriptive information into bins identifies each unknown item in the image and correlates attributes in the descriptive information with different unknown items, so each bin corresponds to an unknown item and includes descriptive information comprising attributes of the unknown item.

Based on attributes of an unknown item in a bin corresponding to the unknown item, the online system 140 generates 320 a target embedding representing the unknown item in a high-dimensional space. In various embodiments, the online system 140 maintains a trained embedding model that generates an embedding for an item based on attributes of the item. The online system 140 applies the embedding model to each item identified to the online system 140 to represent each item in the latent space. For example, the online system 140 applies the embedding model to each item included in an item catalog for a source, generating an embedding for each item in the item catalog in the latent space. In various embodiments, the online system 140 leverages the embedding model to generate 320 the target embedding for an unknown item corresponding to a bin based on the attributes of the unknown item included in the bin. Alternatively, the online system 140 trains a separate embedding model to generate 320 the target embedding for the unknown item based on attributes of the unknown item included in a corresponding bin. Hence, the target embedding represents the unknown item corresponding to the bin in a common latent space as other items based on the attributes of the unknown item identified from the descriptive information during segmentation.

Based on the target embeddings and embeddings for items in an item catalog, the online system 140 selects 325 a set of candidate embeddings for items. In various embodiments, the online system 140 retrieves an item catalog associated with a source identified by the user. As another embodiment, the online system 140 retrieves an item catalog for a source associated with the image or identified by the descriptive information extracted from the image. In another example, the online system 140 selects a source based on one or more characteristics of the user and retrieves an item catalog associated with the selected source.

In various embodiments, the online system 140 retrieves one or more indices of embeddings for items and identifiers of items. In some embodiments, an index comprises an item catalog having multiple entries, with each entry including an identifier of an item, an embedding of the item, and one or more attributes of the item. However, in other embodiments, an index comprises multiple item identifiers and associated embeddings for items. Multiple indices may be retrieved and used to select 325 the set of candidate embeddings in various embodiments.

The online system 140 selects 325 the set of candidate embeddings based on distances or measures of similarity between the target embedding and embeddings of items, such as items in an item catalog or in an index of embeddings. For example, the online system 140 applies one or more nearest neighbor models to the target embedding and to embeddings of items. In some embodiments, a nearest neighbor model determines a distance between the target embedding and an embedding of an item in the latent space. For example, the nearest neighbor model determines a Euclidean distance between the target embedding and each of a set of embeddings for various items. Based on the distances to the target embedding, the nearest neighbor model ranks embeddings corresponding to items. For example, the nearest neighbor model ranks embeddings so embeddings having smaller distances to the target embedding have higher positions in the ranking. The nearest neighbor model selects 325 the set of candidate embeddings as embeddings for items having at least a threshold position in the ranking, so the candidate embeddings are nearest to the target embedding in the latent space. Alternatively, the nearest neighbor model selects 325 candidate embeddings as embeddings for items having less than a threshold distance to the target embedding.

In other embodiments, a nearest neighbor model determines a measure of similarity (e.g., cosine similarity, dot product) between the target embedding and an embedding of an item in the latent space. For example, the nearest neighbor model determines a measure of similarity between the target embedding and each of a set of embeddings for items. Based on the measures of similarity, the nearest neighbor model ranks embeddings corresponding to items so embeddings with larger measures of similarity have higher positions in the ranking, in various embodiments. The nearest neighbor model selects 325 the set of candidate embeddings as embeddings having at least a threshold position in the ranking, so the candidate embeddings have larger measures of similarity to the target embedding. Alternatively, the nearest neighbor model selects 325 the candidate embeddings as embeddings for items having at least a threshold measure of similarity to the target embedding.

The online system 140 identifies a candidate item corresponding to each candidate embedding and retrieves 330 attributes of each candidate item from an item catalog. Selecting the candidate embeddings allows the online system 140 to identify candidate items and to retrieve 330 attributes of each of the candidate items. In various embodiments, each embedding is associated with an item identifier corresponding to a candidate item in an item catalog, so the online system 140 retrieves 330 attributes associated with the item identifier from the item catalog. The online system 140 retrieves 330 a subset of attributes of a candidate item from the item catalog in some embodiments, while in other embodiments the online system 140 retrieves 330 each attribute of the candidate item from the item catalog. The retrieved attributes of a candidate item comprise text data in various embodiments. For example, retrieved attributes of a candidate item comprise a text name of an attribute and a textual value of the attribute.

Based on the attributes of each candidate item and the attributes of the unknown item from the corresponding bin, the online system 140 generates 335 a ranking of the candidate items. In various embodiments, the online system 140 generates a prompt for the generative model including text including identifiers of each candidate item, attributes associated with each candidate item, and attributes of the unknown item from its corresponding bin. The prompt also includes an instruction to rank the candidate items included in the prompt based on similarity between their attributes and the attributes of the unknown item. In some embodiments, the instruction also specifies a number of candidate items to include in the ranking, allowing the prompt to customize the number of candidate items that are ranked. The online system 140 applies the generative model to the prompt, with the generative model generating 335 the ranking of the candidate items based on relationships between portions of text the generative model previously learned during a pre-training process. Candidate items with attributes more similar to attributes of the unknown item from the corresponding bin have higher positions in the ranking. While selecting 325 the candidate embeddings enables the online system 140 to identify candidate items that are nearest to, or most similar to, the target embedding for the unknown item in the latent space, different attributes of candidate items in the set may be more or less similar to attributes of the unknown item. So, applying the generative model to attributes of candidate items corresponding to the candidate embeddings allows more precise ranking of candidate items based on similarities of their attributes to the attributes of the unknown item. This causes candidate items more similar to the unknown item to have higher positions in the ranking and to be more visible to the user. For example, the candidate items include multiple sizes of a particular item, as the online system 140 offers different sizes of the same item, and the ranking generated 335 by the generative model based on the attributes of the candidate items and the attributes of the unknown item has items corresponding to sizes of the particular item matching or nearest to a size comprising an attribute of the unknown item.

The online system 140 presents 340 at least a subset of the candidate items to the user based on the ranking. In various embodiments, the online system 140 presents 340 the user with a list including a subset of the candidate item in an order based on the ranking. For example, the online system 140 selects a subset of the candidate items having at least a threshold position in the ranking and presents 340 the user with the list including the selected subset of the candidate items. The list includes a name of each candidate item and an image of each candidate item in some embodiments, while additional or alternative attributes of each candidate item may be included and presented 340 to the user in various embodiments. The online system 140 presents 340 each of the candidate items in the order based on the ranking in some embodiments. For example, the prompt to which the generative model was applied to generate 335 the ranking of the candidate items includes a number of items to include in the ranking, so the online system 140 displays 340 the complete ranking of candidate items in the order of the ranking.

While conventional techniques for identifying items within an image train one or more models based on multiple training images of different items, the method described above in conjunction with FIG. 3 leverages one or more OCR models and VLMs to extract descriptive information about one or more unknown items from an image, with a generative model segmenting the descriptive information into bins corresponding to different unknown items. Rather than directly identify one or more items from the image using a trained model, the model described in conjunction with FIG. 3 determines an embedding for an unknown item in the bin based on attributes in the bin and uses the embedding to identify embeddings of one or more items offered by the online system 140. Hence, rather than train a model using training images of different items to identify an item in an image, the online system 140 extracts attributes of items in an image that are subsequently used to select items offered by the online system 140. This reduces time and computational resources expended by the online system 140 to identify items in an image by leveraging OCR models and VLMs to extract attributes of items in an image rather than by training a model to identify visual features of an item in an image using various training images of the item.

Figure 4:
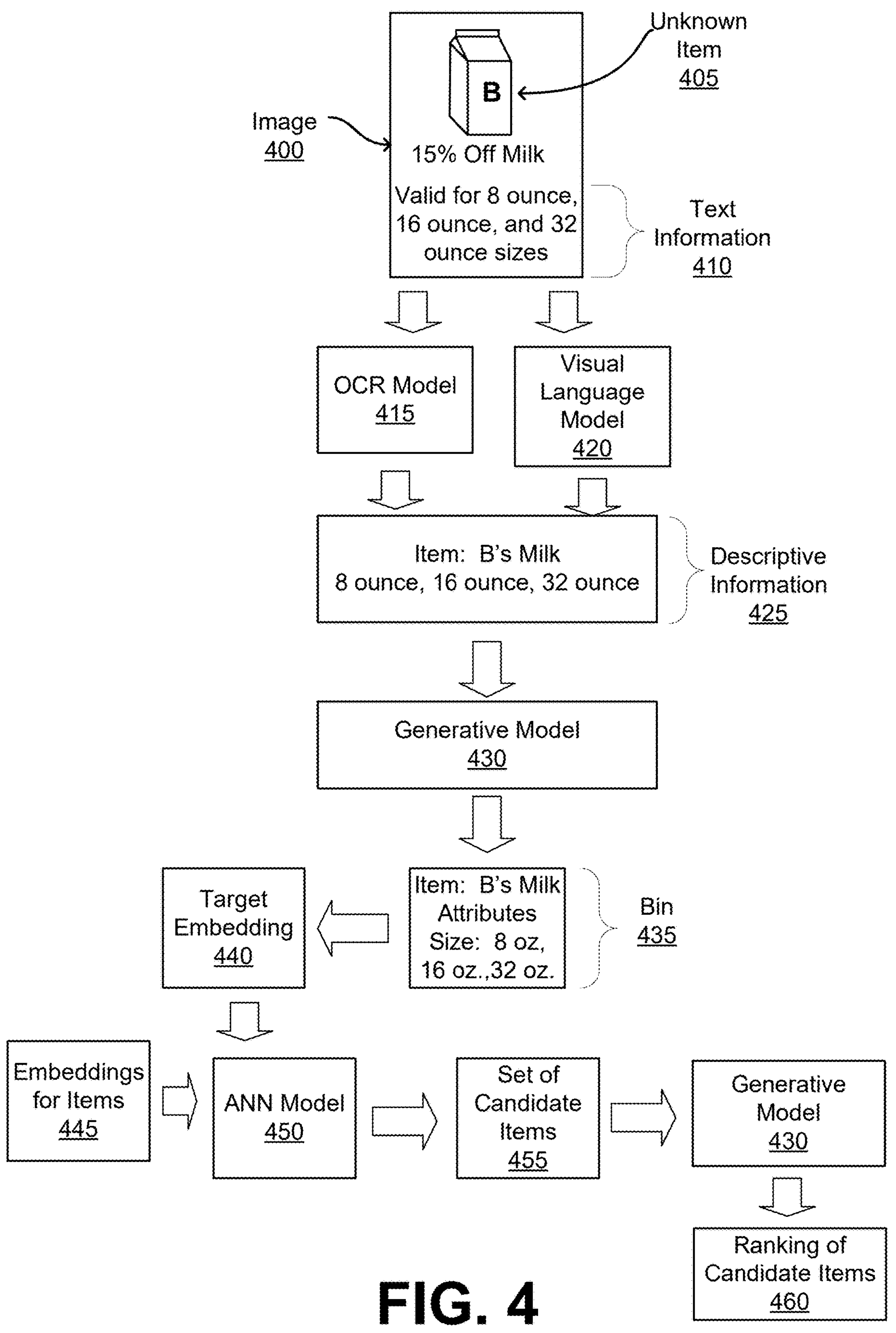
FIG. 4 illustrates a process flow diagram of a method for an online system to identify one or more items offered by a source matching an unknown item extracted from an image, in accordance with one or more embodiments.

FIG. 4 is a process flow diagram of one or more embodiments of a method for an online system to identify one or more items offered by a source matching an unknown item extracted from an image. The online system 140 receives an image 400 from a client device, such as a user client device 100 or a picker client device 110, including one or more unknown items 405. The image does not include metadata or other data used by the online system 140 to uniquely identify items in the image 400. Also, online system 140 does not receive data used by the online system 140 to uniquely identify items in the image 400. Hence, items included in the image are unknown items 405, as the online system 140 is unable to identify a unique item offered by the online system from the image itself.

The image 400 may include different content in various embodiments. In the example of FIG. 4, the image 400 is of a flyer or other material including the unknown item 405 and text information 410. The text information 410 may include information about the unknown item 405, such as one or more attributes of the unknown item, as well as other information, such as a discount or another incentive for a user to obtain the unknown item 405. As another example, the image 400 is of the unknown item 400 without text information 410. For example, the image 400 includes one or more unknown items 405 and was captured by a user via a user client device 100. The image 400 may include multiple unknown items 405. For example, the image 400 is a portion of an area including multiple items, such as a cabinet, an aisle, or a shelf including multiple items. The image 400 may be received from a picker client device 110 in some embodiments. For example, the image 400 includes a portion of an aisle of a source including multiple items captured by a picker. Each item in the image 400 is an unknown item 405 in the preceding example.

The online system 140 leverages the image 400 to simplify creation of an order or selection of an item by identifying one or more items offered by the online system 140 corresponding to the unknown item 405. To identify one or more items offered by the online system 140 corresponding to the unknown item 405, the online system 140 applies one or more models, such as an optical character recognition (OCR) model 415 and a visual language model 420, to the image 400 to extract descriptive information 425 about each unknown item 405 included in the image 400. In other embodiments, the online system 140 extracts descriptive information 425 about each unknown item 405 in the image 400 by applying one or more different, additional, or alternative models to the image 400. The online system 140 applies multiple models, such as the OCR model 415 and the visual language model 420, in parallel to the image 400 in various embodiments.

Applying the OCR model 415 to the image 400 extracts the text information 410 from the image 400 to include in the descriptive information 425. The OCR model 415 identifies portions of the image 400 including text, such as the text information 410, and extracts the text from the corresponding portions of the image 400. In the example of FIG. 4, the OCR model 415 extracts "15% off milk," and "valid for 8 ounce, 16 ounce, and 32 ounce sizes" from the text information 410 and extracts "B" from the unknown item 405 included in the image 400. One or more OCR models 415 may be applied to the image 400 in various embodiments to extract text from the image 405.

While the OCR model 415 extracts text from the image 400 for the descriptive information 425, other visual features of the image 400 include descriptive information 425 about the unknown item 405 (or about different unknown items 405) included in the image 400. Further, some images may not include text information 410, so visual features of such images provide the descriptive information 425 about the unknown item 405 included in the image 400. To extract descriptive information 425 from visual features of the image 400, the online system 140 applies one or more visual language models 420 to the image 400. A visual language model (VLM) 420 receives the image 400 and a prompt as input, and generates an output for the prompt based on the image 400, as further described above in conjunction with FIG. 3. The output of the visual language module 420 comprises descriptive information 425 about the unknown item 405. In various embodiments, the online system 140 applies the visual language model 420 to combinations of different prompts and the image 400 to extract different types of descriptive information 425 about the unknown item 405 from the image 400. The online system 140 may apply multiple VLMs 420 to the image 400 in some embodiments. In the example of FIG. 4, application of the visual language model 420 to the image 400 generates a name of the unknown item 405 as "B's milk" from visual features of the unknown item 405 in the image 400.

While applying one or more OCR models 415 and one or more VLMs 420 to the image 400 extracts descriptive information 425 about the unknown item 405, the descriptive information 425 may not initially be clearly associated with the unknown item 405. For example, the descriptive information 425 includes the text information 410 describing the discount or the incentive to obtain the unknown item 405, which is unrelated to identifying the unknown item 405. Similarly, the VLM 420 may not identify one or more unknown items 405 in the image 400, while identifying other unknown items 405. Similarly, descriptive information 425 extracted by the OCR model 415 includes text from the image that does not initially have a format where attributes of the unknown item 405 in the text descriptive information are clearly associated with the unknown item 405.

To correlate descriptive information 425 extracted by the OCR model 415 and by the VLM 420 with the unknown item 405, the online system 140 applies a generative model 430, such as a large language model (LLM), to the descriptive information 425. In various embodiments, the online system 140 generates a prompt for the generative model 430 including the descriptive information 425 and one or more instructions to segment the descriptive information 425 into one or more bins 435, with each bin 435 corresponding to an unknown item 405 included the image 400 and including descriptive information 425 corresponding to attributes of the unknown item 405. An instruction included in the prompt specifies a format for a bin 435. For example, the prompt includes an instruction to generate a bin 435 for each unknown item 405 identified in the image, with the bin 435 including a name or a description of the unknown item 405 and one or more attributes of the unknown item 405 determined from the descriptive information 425 by the generative model 430. The bin 435 corresponding to the unknown item 405 comprises a search query including a name or a description of the unknown item 405 and attributes of the unknown item 405 from the descriptive information 425 in various embodiments.

Applying the generative model 430 to the descriptive information 425 segments the descriptive information 425 extracted from the image 400 into one or more bins 435 that each include a name or a description of an unknown item 405 in the image 400. Similarly, applying the generative model 430 to the descriptive information 425 identifies specific attributes of an unknown item 405 from the descriptive information 425 output by the OCR model 415 and the visual language model 420 and includes the attributes of the unknown item 405 in the bin 435 corresponding to the unknown item 405. This segmentation of discrete unknown items 405 from the descriptive information 425 and identification of attributes of each unknown item 405 from the descriptive information 425 generates different bins for different unknown items 405, with each bin 435 including a name or a description of an unknown item 405 and attributes corresponding to the unknown item 405.

Based on the attributes of the unknown item 405 included in the bin 435 corresponding to unknown item 405, the online system 140 generates a target embedding 440 for the unknown item 405. As further described above in conjunction with FIG. 3, the online system 140 applies an embedding model to the attributes of the unknown item included in the bin 435 to generate the target embedding 440 representing the unknown item 405 corresponding to the bin 435 in a latent space. In various embodiments, the online system 140 also applies the embedding model to items included in an item catalog of a source to generate embeddings for each item in the item catalog. The online system 140 may apply the embedding model to each item identified to the online system 140 by a source to generate an embedding for each item in the latent space. In some embodiments, the online system 140 maintains an index of embeddings for items to facilitate subsequent retrieval of embeddings for items. In various embodiments the index of embeddings for a source includes an identifier of an item and an embedding for the item. The index of embeddings may be included in the item catalog for the source, with the embedding for an item included in the item catalog in association with an item identifier and attributes of the item. Hence, the target embedding 440 represents the unknown item 405 corresponding to the bin 435 in a common latent space as other items previously identified to the online system 140.

The online system 140 applies an approximate nearest neighbor (ANN) model 450 to the target embedding 440 and to embeddings for items offered by a source, or otherwise identified to the online system 140, to select a set 455 of candidate items. As further described above in conjunction with FIG. 3, in various embodiments, ANN model 450 determines distances (e.g., Euclidean distances) between the target embedding 440 and embeddings for various items, ranks the embeddings for various items based on the distances from the target embedding 440, and selects a set 455 of candidate embeddings having at least a threshold position in the ranking. The ranking in the preceding example includes embeddings for items having smaller distances to the target embedding 440 in higher positions. In other embodiments, the ANN model 450 determines measures of similarity (e.g., cosine similarity, dot product) between the target embedding 440 and embeddings for various items (e.g., items included in an item catalog), ranks the items based on the measures of similarity to the target embedding 440, and selects a set 455 of candidate embeddings having at least a threshold position in the ranking. The ranking in the preceding example includes embeddings for items having higher measures of similarity to the target embedding 440 in higher positions. The set 445 of candidate items comprise items corresponding to the set of candidate embeddings. Hence, the ANN model 450 selects a set 455 of candidate embeddings that are nearest to the target embedding 440 (or that have higher measures of similarity to the target embedding 440). As the set 455 of candidate items are items corresponding to the candidate embeddings, each of the candidate items has an embedding that is near the target embedding 440 in the latent space.

While selecting the candidate embeddings based on distances, or measures of similarity, between the target embedding 440 and embeddings for items selects a set 455 of candidate items nearest to the target embedding 440 in a latent space, different attributes of candidate items in the set 455 may be more or less similar to attributes of the unknown item 405. For example, different items offered by the online system 140 have multiple attributes matching attributes of the unknown item 405, so the different items are included in the set 455 of candidate items. However, certain attributes of one or more candidate items are more similar to attributes of the unknown item 405 included in the bin 435, which the ANN model 450 does not fully account for when selecting candidate embeddings for the set 455 of candidate items. While the ANN model 450 selects a set 455 of candidate items that are similar to the unknown item, the set 455 does not specify which candidate item is most similar to the unknown item 405.

To simplify subsequent review or selection of a candidate item of the set 455 by a user, the online system 140 retrieves attributes of each candidate item from an item catalog and generates a prompt including identifiers of each candidate item and associated attributes, the attributes of the unknown item 405 included in the bin 435, and an instruction to rank the candidate items based on similarity of their attributes to the attributes included in the bin 435. The online system 140 applies the generative model 430 to the prompt to generate a ranking 460 of the candidate items based on similarity of attributes of different candidate items to attributes included in the bin 435 corresponding to the unknown item 405. In various embodiments, the prompt to which the generative model 430 is applied specifies a number of candidate items to include in the ranking 460. In the ranking 460, candidate items having attributes more similar to attributes of the unknown item 405 have higher positions in the ranking 460.

Applying the generative model 430 to the attributes included in the bin 435 and to the attributes of different candidate items further refines an ordering of the candidate items of the set 455. This refinement positions candidate items with attributes more similar to attributes of the unknown item 405 in higher positions in the ranking 460, making them more likely to be visible to a user. For example, the set 455 of candidate items includes candidate items having multiple common attributes and a single differing attribute (e.g., size), so applying the generative model 430 to the attributes of the candidate items and to the attributes included in the bin 435 corresponding to the unknown item 405 generates a ranking 460 having candidate items with sizes closer to the size of the unknown item 405 in higher positions.

Subsequently, the online system 140 presents the candidate items to the user in an order determined by the ranking 460. In some embodiments, the online system 140 presents a subset of the set 455 of candidate items to the user in the order determined by the ranking 460, while in other embodiments, the online system 140 presents the set 455 of candidate items in the order determined by the ranking 460. The prompt to generate the ranking 460 specifies a number of candidate items to include in the ranking 460 in various embodiments, so the online system 140 presents the number of items specified by the prompt to the user based on the ranking 460.

Generating the target embedding 440 for the unknown item 400 from descriptive information 425 for the unknown item 405 extracted from the image 400 by the OCR model 415 and the visual language model 420 allows the online system 140 to leverage stored embeddings for items to identify the set 455 of candidate items for the unknown item 405 using the ANN model 450. This identifies the set 455 of candidate items for the unknown item 405 without specifically training a model to identify different items from images through application to labeled training images of individual items. Identifying the unknown item 405 and its attributes through application of the OCR model 415 and the visual language model 420 to the image 400 allows generation of the target embedding 440 for the unknown item 405 from the image 400. The online system 140 compares the target embedding 440 to embeddings for other items, which reduces an amount of time and computational resources used by the online system 140 for identifying an item in an image by leveraging descriptive information 425 extracted from the image. Using the target embedding 440 based on the extracted descriptive information also enables identification of a greater variety of items from images without specialized training of a model for each item. simplifies identification of items offered by the online system 140.

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

receiving an image at the computer system, the image including an unknown item;

extracting descriptive information about the unknown item from the image based on content of the image;

segmenting the descriptive information into a bin corresponding to the unknown item by applying a generative artificial intelligence (AI) model to the descriptive information, the bin including one or more attributes of the unknown item the generative AI model identified from the descriptive information;

generating a target embedding for the unknown item based on the one or more attributes of the unknown item included in the bin;

selecting, based on the target embedding, a set of candidate embeddings from a database of known embeddings, each candidate embedding corresponding to a known item;

retrieving, from an item database, a set of attributes for each candidate item;

generating a ranking of the candidate items by applying the generative AI model to a prompt, the prompt including the attributes of each candidate item, the attributes of the unknown item, and an instruction to rank the candidate items based on matching the attributes of each of the candidate items to the attributes of the unknown item; and presenting at least a subset of the candidate items based on the ranking the presenting causing the subset of the candidate items to be displayed in a graphical user interface.

2. The method of claim 1, wherein extracting descriptive information about the unknown item from the image based on text content and visual content of the image comprises:

extracting text data from the image by applying one or more optical character recognition models to the image; and extracting descriptive information from non-textual portions of the image by applying one or more visual language models to the image.

3. The method of claim 1, wherein segmenting the descriptive information into the bin corresponding to the unknown item by applying the generative AI model to the descriptive information comprises:

applying the generative AI model to a prompt including the descriptive information extracted from the image and an instruction including a format for the bin.

4. The method of claim 3, wherein the format for the bin comprises a name or a description of the unknown item and one or more attributes of the unknown item determined from the descriptive information by the generative AI model.

5. The method of claim 1, wherein selecting, based on the target embedding, the set of candidate embeddings from the database of known embeddings comprises:

retrieving an index including identifiers of items and an embedding for an item corresponding to each identifier;

generating a distance between the target embedding and each embedding in the index;

ranking the embeddings in the index so embeddings with smaller distances to the target embedding have higher positions in the ranking; and selecting, as the set of candidate embeddings, embeddings having at least a threshold position in the ranking.

6. The method of claim 1, wherein selecting, based on the target embedding, the set of candidate embeddings from the database of known embeddings comprises:

retrieving an index including identifiers of items and an embedding for an item corresponding to each identifier;

generating a measure of similarity between the target embedding and each embedding in the index;

ranking the embeddings in the index so embeddings with larger measures of similarity to the target embedding have higher positions in the ranking; and selecting, as the set of candidate embeddings, embeddings having at least a threshold position in the ranking.

7. The method of claim 1, wherein attributes of a candidate item comprise text data including a name of an attribute and a textual value of the attribute.

8. The method of claim 1, wherein generating a ranking of the candidate items by applying the generative AI model to a prompt comprises including, in the prompt, a specification of a number of candidate items to include in the ranking.

9. The method of claim 8, wherein presenting at least the subset of the candidate items in an order based on the ranking comprises presenting the number of candidate items specified by the prompt.

10. A computer program product comprising a non-transitory computer readable storage medium having instructions encoded thereon that, when executed by a processor, cause the processor to perform steps comprising:

receiving an image, the image including an unknown item;

extracting descriptive information about the unknown item from the image based on content of the image;

segmenting the descriptive information into a bin corresponding to the unknown item by applying a generative artificial intelligence (AI) model to the descriptive information, the bin including one or more attributes of the unknown item the generative AI model identified from the descriptive information;

generating a target embedding for the unknown item based on the one or more attributes of the unknown item included in the bin;

selecting, based on the target embedding, a set of candidate embeddings from a database of known embeddings, each candidate embedding corresponding to a known item;

retrieving, from an item database, a set of attributes for each candidate item;

generating a ranking of the candidate items by applying the generative AI model to a prompt, the prompt including the attributes of each candidate item, the attributes of the unknown item, and an instruction to rank the candidate items based on matching the attributes of each of the candidate items to the attributes of the unknown item; and presenting at least a subset of the candidate items based on the ranking the presenting causing the subset of the candidate items to be displayed in a graphical user interface.

11. The computer program product of claim 10, wherein extracting descriptive information about the unknown item from the image based on text content and visual content of the image comprises:

extracting text data from the image by applying one or more optical character recognition models to the image; and extracting descriptive information from non-textual portions of the image by applying one or more visual language models to the image.

12. The computer program product of claim 10, wherein segmenting the descriptive information into the bin corresponding to the unknown item by applying the generative AI model to the descriptive information comprises:

applying the generative AI model to a prompt including the descriptive information extracted from the image and an instruction including a format for the bin.

13. The computer program product of claim 12, wherein the format for the bin comprises a name or a description of the unknown item and one or more attributes of the unknown item determined from the descriptive information by the generative AI model.

14. The computer program product of claim 10, wherein selecting, based on the target embedding, the set of candidate embeddings from the database of known embeddings comprises:

retrieving an index including identifiers of items and an embedding for an item corresponding to each identifier;

generating a distance between the target embedding and each embedding in the index;

ranking the embeddings in the index so embeddings with smaller distances to the target embedding have higher positions in the ranking; and selecting, as the set of candidate embeddings, embeddings having at least a threshold position in the ranking.

15. The computer program product of claim 10, wherein selecting, based on the target embedding, the set of candidate embeddings from the database of known embeddings comprises:

retrieving an index including identifiers of items and an embedding for an item corresponding to each identifier;

generating a measure of similarity between the target embedding and each embedding in the index;

ranking the embeddings in the index so embeddings with larger measures of similarity to the target embedding have higher positions in the ranking; and selecting, as the set of candidate embeddings, embeddings having at least a threshold position in the ranking.

16. The computer program product of claim 10, wherein attributes of a candidate item comprise text data including a name of an attribute and a textual value of the attribute.

17. The computer program product of claim 10, wherein generating a ranking of the candidate items by applying the generative AI model to a prompt comprises including, in the prompt, a specification of a number of candidate items to include in the ranking.

18. The computer program product of claim 17, wherein presenting at least the subset of the candidate items in an order based on the ranking comprises presenting a number of candidate items specified by the prompt.

19. A system comprising:

a processor; and a non-transitory computer readable storage medium having instructions encoded thereon that, when executed by the processor, cause the processor to perform steps comprising:

receiving an image, the image including an unknown item;

extracting descriptive information about the unknown item from the image based on content of the image;

segmenting the descriptive information into a bin corresponding to the unknown item by applying a generative artificial intelligence (AI) model to the descriptive information, the bin including one or more attributes of the unknown item the generative AI model identified from the descriptive information;

generating a target embedding for the unknown item based on the one or more attributes of the unknown item included in the bin;

selecting, based on the target embedding, a set of candidate embeddings from a database of known embeddings, each candidate embedding corresponding to a known item;

retrieving, from an item database, a set of attributes for each candidate item;

generating a ranking of the candidate items by applying the generative AI model to a prompt, the prompt including the attributes of each candidate item, the attributes of the unknown item, and an instruction to rank the candidate items based on matching the attributes of each of the candidate items to the attributes of the unknown item; and presenting at least a subset of the candidate items based on the ranking the presenting causing the subset of the candidate items to be displayed in a graphical user interface.

20. The system of claim 19, wherein extracting descriptive information about the unknown item from the image based on text content and visual content of the image comprises:

extracting text data from the image by applying one or more optical character recognition models to the image; and extracting descriptive information from non-textual portions of the image by applying one or more visual language models to the image.

* * * * *